May 16, 1933.  K. PFEIFFER ET AL  1,909,423
CLUTCH CONTROL APPARATUS
Filed Sept. 30, 1931
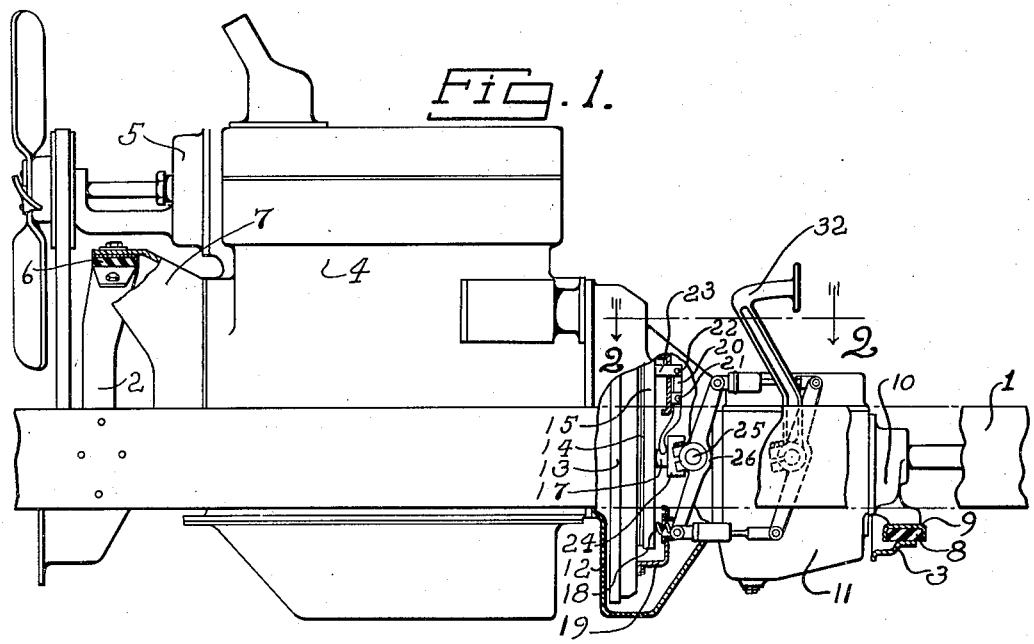
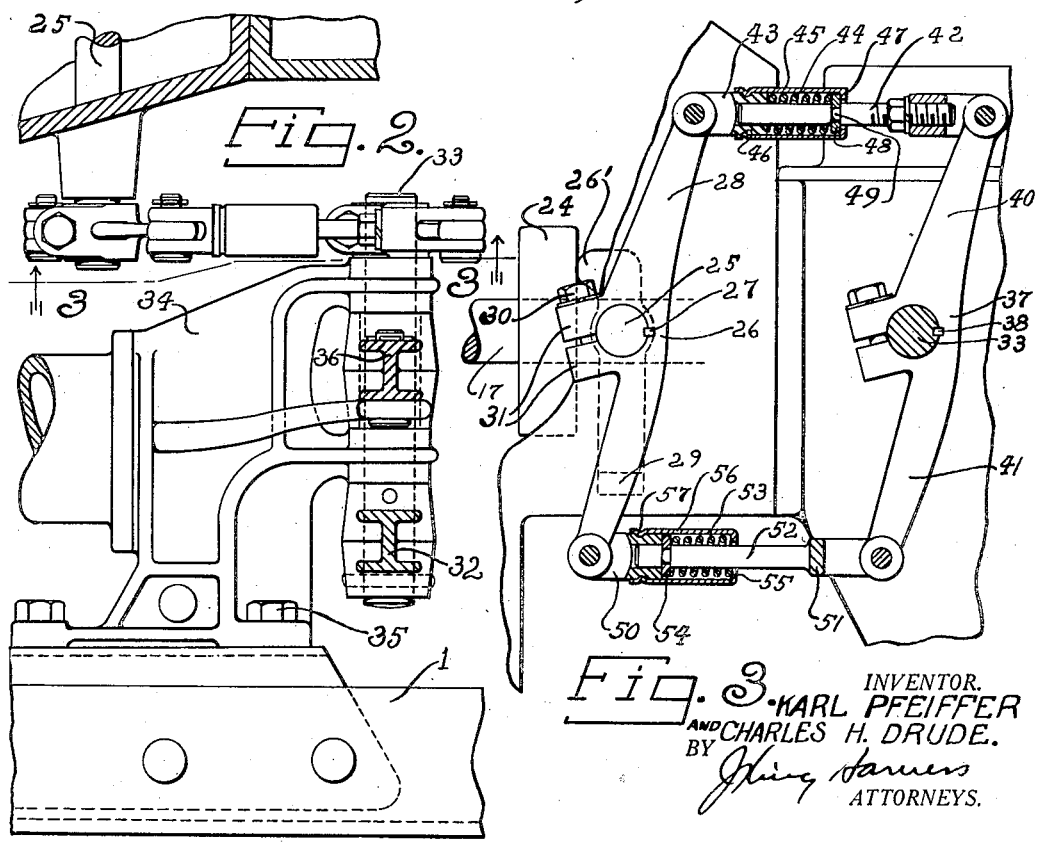
INVENTOR.
KARL PFEIFFER
AND CHARLES H. DRUDE.
BY
ATTORNEYS.

Patented May 16, 1933

1,909,423

UNITED STATES PATENT OFFICE

KARL PFEIFFER, OF DETROIT, AND CHARLES H. DRUDE, OF FERNDALE, MICHIGAN, ASSIGNORS TO CHRYSLER CORPORATION, OF DETROIT, MICHIGAN, A CORPORATION OF DELAWARE

CLUTCH CONTROL APPARATUS

Application filed September 30, 1931. Serial No. 566,062.

This invention relates to improved clutch control apparatus and particularly to apparatus of this character for controlling the clutch of a resiliently mounted vehicle engine.

The clutch pedal and associated operating elements of the clutch control mechanism of resiliently mounted vehicle engines are preferably mounted on the rigid frame structure of the vehicle and connected by linkage to the control shaft of the clutch so as to permit movement of the engine upon its mounting without oscillating the clutch pedal relative to the body structure of the vehicle. When the clutch control shaft and pedal operated members are connected by a single link or by linkage on only one side of the axis of the shaft, depression of the clutch pedal urges the engine longitudinally and places the resilient mountings under compression. Then, when the engine tilts transversely under the influence of the torque reaction created during engaging of the clutch, the pressure directed longitudinally upon the engine by the linkage is relieved and the resilient mountings urge the engine longitudinally in an opposite direction to its normal position, resulting in relative rotation of the clutch control shaft in a direction which suddenly brings the clutch elements into engaged condition. Repeated oscillations of the engine while the clutch pedal is subjected to foot pressure, in this way causes rapid engagement and disengagement of the clutch which creates severe chattering of the clutch and fluttering of the clutch pedal.

The main objects of this invention are to provide clutch control mechanism which prevents longitudinal displacement of a resiliently mounted engine during depression of the clutch pedal; to provide links in mechanism of this kind which exert substantially equal and opposite longitudinal directed forces on the engine during rotation of the clutch control shaft by depression of the clutch pedal; to provide tension and compression links which have relatively movable sections yieldably held against elongation and retraction, respectively, so as to prevent variation of the relation of the clutch elements by tilting of the engine about its axis; to obviate fluttering of the clutch pedal by variations in the thickness of the clutch lining; and to provide mechanism which is particularly adapted for controlling the clutch of a resiliently mounted vehicle engine and which prevents actuation of the clutch control shaft by movement of the engine relative to the rigid frame structure of the vehicle.

An illustrative embodiment of the invention is shown in the accompanying drawing, in which:

Fig. 1 is a side elevation of an internal combustion vehicle engine illustrating the clutch thereof, partly in section, and showing clutch control mechanism which embodies the invention.

Fig. 2 is a fragmentary horizontal section taken on the line 2—2 of Fig. 1.

Fig. 3 is a fragmentary vertical section taken on the line 3—3 of Fig. 2.

In the form shown, our improved clutch control mechanism is illustrated in conjunction with a power unit of a vehicle which includes a rigid frame structure 1 having front and rear transverse members 2 and 3, respectively, on which the corresponding ends of an internal combustion engine 4 are supported. Mounted on the front of the engine, substantially below the water pump housing 5 thereof, is a yieldable cushion 6, preferably comprising rubber, which is interposed between a bracket 7 on the crank case of the engine 4 and the central portion of the transverse element 2 of the frame structure. The rear end of the engine is yieldably supported by a rubber cushion 8 of substantially semi-cylindrical shape which is received in a correspondingly shaped channel 9 of a bracket 10 that is rigidly mounted on the rear end of the transmission casing 11. The rear cushion 8 is rigidly secured to the mid-portion of the transverse member 3 in any suitable manner, such as by vulcanization. The cushions 6 and 8 provide resilient mountings which permit the engine to tilt freely in transverse directions under the influence of the torque reaction thereof when power is derived from the unit.

Located between the engine and transmission casing 11 is a clutch having a housing 12 in which the fly wheel 13 of the engine is received. The clutch includes a pair of friction elements 14, one secured to the fly wheel 13 and the other mounted on a disc which is splined and shiftably mounted on the transmission shaft 17. The disc 15 is normally urged with substantial pressure towards the fly wheel 13 by springs 18 which bear between the disc 15 and a circular housing 19 that is carried by the fly wheel. This action retains the frictional clutch element 14 in engaged relation.

The clutch is provided with clutch disengaging mechanism for retracting the disc 15 against the action of the springs 18. In the form shown, this mechanism includes a plurality of levers 20 which are pivotally mounted intermediate their ends at 21 on the housing 19. The outer ends of the levers 20 are pivotally connected at 22 to lugs 23 formed integrally with the disc 15. The inner ends of the levers extend to within close proximity of the transmission shaft 17 and register with a collar 24 which is splined on the transmission shaft.

Journaled in the clutch casing 12 is a clutch control shaft 25 which extends transversely with respect to the transmission shaft 17 and which has a yoke 26' at its intermediate portion that operates upon the collar 24 so as to shift the latter against the inner ends of the levers 20. When the shaft 25 is rotated in a counterclockwise direction the collar 24 is moved forwardly and the levers 20 are rotated in a clockwise direction so as to move the disc 15 rearwardly against the action of the springs 18, thus disengaging the clutch. A lever 26 is fixed against rotation on the external end of the shaft 25 by a key 27. This lever has upwardly and downwardly extending arms 28 and 29 of substantially equal length located on the opposite sides of the axis of the clutch control shaft. The lever 26 is releasably clamped upon the shaft 25 by a bolt 30 threaded in registered bosses 31 located at the intermediate portion of the lever.

The clutch control mechanism is connected with operating means including a clutch pedal 32 which extends through the floor of the body of the vehicle, not shown, into the passenger compartment. This pedal is non-rotatably fixed on the shaft 33 which is journaled in a bracket 34 that is rigidly secured by bolts 35 to the frame structure 1 of the vehicle chassis, as illustrated in Fig. 2. The shaft 33 also forms a journal for the brake pedal 36. A lever 37 is fixed against rotation on the shaft 33 by a key 38. This lever includes upwardly and downwardly extending arms 40 and 41 which are of substantially equal length and which are located on opposite sides of the axis of the shaft 33. The upper ends of the levers 26 and 37 are connected together by a compression link which includes relatively movable sections 42 and 43 having a coil spring 44 coacting therebetween for yieldably resisting inward movement of the sections 42 and 43. The coil spring 44 is enclosed within a sleeve 45 which has peripheral portions crimped into a groove 46 in the section 43 or otherwise rigidly secured thereto, as for example by welding. Formed on the outer end of the sleeve 45 is an inwardly extending flange 47 which engages a ring 48 that is received in a groove 49 in the section 42 of the link and positively limits outward movement of the sections. The spring 44 bears between the extremity of the section 43 and the ring 48.

The lower ends of the levers 26 and 37 are pivotally connected together by a tension link which includes relatively movable sections 50 and 51. The section 51 has a stem portion 52 which is received in a passage in the section 50 and which is yieldably held against outward movement by a spring 53 that bears between a ring 54 on the stem 52 and an end flange 55 of a tubular sleeve 56 which is welded at 57 or otherwise secured to the section 50.

When the clutch pedal 32 is depressed the compression and tension links turn the lever 26 and the clutch control shaft, upon which it is mounted, in a counterclockwise direction for disengaging the clutch. The tension and compression links are held under tension and compression, respectively, of substantially equal amplitude while the pedal 32 is held in a depressed position. For this reason all tendency of the engine to shift forwardly by the compression applied on the upper link is neutralized by the tension on the lower link which tends to move the engine rearwardly. The yieldably connected sections of the links permit the lever 26 to oscillate in unison with the engine without rotating the clutch control shaft 33 and without disturbing the position of the clutch pedal 32. By avoiding displacement of the engine in the direction of its length and compression of the mountings, rotation of the clutch control shaft 25 by the return movement of the engine during oscillation thereof from its normal position is avoided, thus eliminating repeated engagement and disengagement of the clutch by the movement of the engine and the accompanying clutch chattering and pedal fluttering.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What we claim is:

1. In a power unit including a rigid frame structure and an internal combustion engine yieldably mounted thereon having a clutch, a rotatable control element for said clutch carried by said engine, operating mechanism pivotally mounted on said frame structure, and means connecting said operating mechanism and rotatable element on respectively opposite sides of the axes thereof for rotating said control element and adapted to prevent urging of said engine forwardly by the clutch disengaging operation, including a pair of links each having a pair of relatively movable sections, one of said links having a spring yieldably opposing contraction thereof and the other having a spring yieldably opposing elongation thereof.

2. In a power unit, a rigid frame structure, an internal combustion engine shiftably mounted on said frame structure including a clutch having a control shaft, a lever fixed on said control shaft extending on respectively opposite sides of the axis thereof, operating mechanism including a lever pivotally mounted intermediate its ends on said frame structure, and means including a contractible link connecting the upper ends of the lever of said operating mechanism and the lever on said control shaft and an extending link connecting the opposite ends of said levers for rotating the lever on said control shaft and holding said engine against displacement during actuation of said operating mechanism.

3. In a power unit, a rigid frame structure, an internal combustion engine shiftably mounted on said frame structure including a clutch having a control shaft, a lever fixed on said control shaft extending on respectively opposite sides of the axis thereof, operating mechanism including a lever pivotally mounted intermediate its ends on said frame structure, and links each including a pair of relatively movable sections connecting the adjacent ends of the lever of said operating mechanism and the lever on said control shaft for rotating the latter and holding said engine against displacement during actuation of said operating mechanism, said links having springs between their relatively movable sections arranged so as to yieldably oppose relative movement of the sections of one link in one direction and relative movement of the sections of the other link in an opposite direction.

4. In combination with a clutch, control apparatus therefor including a rotatable shaft, a lever fixed midway between its ends on said shaft, operating mechanism including a lever pivotally mounted midway between its ends and means for turning said lever, and links connecting the adjacent ends of said levers each including a pair of relatively movable sections and intermediate springs for yieldably resisting relative movement of the sections of each link in an opposite direction respectively.

5. In combination with a clutch, control apparatus therefor including a rotatable shaft, a lever fixed intermediate its ends on said shaft, operating mechanism having a lever pivotally mounted intermediate its ends and means for turning said lever, and links connecting the adjacent ends of said levers for rotating the lever of said shaft, each of said links including a pair of relatively movable sections having springs interposed therebetween for yieldably opposing relative movement of the sections of each link in an opposite direction respectively.

6. In a vehicle including a frame and a yieldably mounted internal combustion engine having a clutch, control apparatus for said clutch including a rotatable member, a lever fixed intermediate its ends on said member, operating mechanism pivotally mounted on said frame having a lever extending on respectively opposite sides of the axis of said mechanism and including a foot pedal, and means pivotally connecting said levers on respectively opposite sides of their axis for preventing displacement of said engine by pedal pressure and fluttering of said pedal.

7. In a vehicle including a frame and a propelling motor having a clutch, resilient mountings on said frame yieldably supporting said motor, clutch control apparatus on said motor including a rotatable element having a lever fixed intermediate its ends thereon, operating mechanism pivoted on said frame including a pedal and having a lever extending on opposite sides of its axis, a compression link pivotally connecting said levers on one side of the axis of said operating mechanism having a yieldable element compressible during compression of said link, and a tension link pivotally connecting said levers on the other side of said axis having a yieldable element compressible when the latter link is placed under tension.

KARL PFEIFFER.
CHARLES H. DRUDE.

CERTIFICATE OF CORRECTION.

Patent No. 1,909,423.  May 16, 1933.

KARL PFEIFFER, ET AL.

It is hereby certified that error appears in the printed specification of the above numbered patent requiring correction as follows: Page 3, line 26, claim 2, for "extending" read "extensible"; and that the said Letters Patent should be read with this correction therein that the same may conform to the record of the case in the Patent Office.

Signed and sealed this 22nd day of August, A. D. 1933.

(Seal)

M. J. Moore.
Acting Commissioner of Patents.